3,654,189
METHOD OF PREPARING POLYMERIC METAL PHOSPHINATES
David L. Venezky, Fairfax County, Va., assignor to the United States of America as represented by the Secretary of the Navy
No Drawing. Continuation-in-part of application Ser. No. 658,985, Aug. 4, 1967. This application Mar. 16, 1970, Ser. No. 20,095
Int. Cl. C08g 33/16, 33/20
U.S. Cl. 260—2 P
16 Claims

ABSTRACT OF THE DISCLOSURE

A method of preparing poly(metal phosphinates) wherein a solution of a dihydrocarbon phosphinic acid in acetic anhydride is heated under reflux with a hydrous polyvalent metal nitrate or a combination of hydrous polyvalent metal nitrates and the products thereof.

CROSS REFERENCE TO RELATED APPLICATION

This is a continuation-in-part application of application Ser. No. 658,985, filed Aug. 4, 1967, now abandoned.

BACKGROUND OF THE INVENTION

This invention relates to a method of preparing poly(metal phosphinates) and the products thereof. Polymeric metal phosphinates have been heretofore prepared from a polyvalent metal acetate and a dihydrocarbon phosphinic acid in which these reactants are contained in a common solvent, such as ethanol, benzene, or pyridine or in separate, mutually immiscible solvents, such as water for the metal acetate and benzene for the phosphinic acid, and the separate solutions are brought into reaction contact by stirring them together.

SUMMARY OF THE INVENTION

It is, therefore, an object of the present invention to provide an improved method for the preparation of polyvalent metal phosphinates using polyvalent metal compounds which are lower in cost and more readily available than corresponding polyvalent metal acetates, and dihydrocarbon phosphinic acids.

It is a further object of this invention to provide novel poly(metal phosphinates).

These and other objects are accomplished by providing a method in which a solution of a dihydrocarbon phosphinic acid in acetic anhydride is heated under reflux with a hydrous polyvalent metal nitrate to form the poly(metal phosphinates). The new poly(metal phosphinates) of the present invention are provided by refluxing the solution of dihydrocarbon phosphinic acid in acetic anhydride with two or more different hydrous polyvalent metal nitrates.

DETAILED DESCRIPTION OF THE PREFERRED EMBODIMENTS

A number of the hydrous polyvalent metal nitrates are available commercially and are, therefore, lower cost starting materials than the polyvalent metal acetates. Acetic anhydride, which is used in large excess, may be recovered from the reaction mixture for reuse in the method by flash evaporation, with coincident separation of the produce polymer, or from the fluid residue after separation of the product polymer which is insoluble in acetic anhydride.

Hydrous polyvalent metal nitrates which may be used in the method of this invention are for example, hydrated nitrates of the metals of Group II–A, (e.g., beryllium, barium, etc.), Group I–B (e.g., copper, silver, etc.), Group II–B (e.g., zinc, cadmium, etc.), Group III–B (e.g., scandium, yttrium, etc.), Group IV–B (e.g., titanium, zirconium, etc.), Group V–B (e.g., vanadium, niobium, etc.), Group VI–B (e.g., chromium, molybdenum, etc.), Group VII–B (e.g., manganese, rhenium), Group VIII (iron, cobalt, nickel, iridium, platinum, etc.) and the rare earths such as cerium, etc. of the periodic table. Furthermore, it is within the scope of the present invention to employ any combination of two or more of these hydrous polyvalent metal nitrates in the present process.

The dihydrocarbon phosphinic acids, $RR'P(O)OH$, used in the method of the invention may be dialkyl, di(arylalkyl), di(alkylaryl), diaryl and alkyl-aryl phosphinic acids. Thus, they may be, for example, dimethyl, di-n-butyl, di-isobutyl, di-n-decyl, di-n-octadecyl, dicyclohexyl, dibenzyl, ditolyl, diphenyl, dinaphthyl, phenylmethyl and phenyl-n-butyl phosphinic acids, etc.

Preparation of the poly(metal phosphinates) by the method of this invention may be achieved with the use of proportions of the hydrous polyvalent metal nitrates and the dihydrocarbon phosphinic acid which are from stoichiometric to more than stoichiometric for the phosphinic acid and which correspond to a ratio which is from 1 mole of the polyvalent metal (calculated as such) to from about 1 to 4 of the dihydrocarbon phosphinic acid. When more than one of the hydrous polyvalent metal nitrates is employed in the process, this same molar ratio is applicable, however, the moles of polyvalent metal used in the ratio is the sum of the mixture of all the polyvalent metals. Furthermore, it is not necessary that equal molar ratios of the hydrous polyvalent metal nitrates be used when more than one is employed in the process. Any molar ratio is applicable herein depending upon the desired ratio of the metals in the final product.

In the practice of the method of the present invention, the dihydrocarbon phosphinic acid is dissolved in the acetic anhydride by gently warming, about 50–60° C. To this solution, after it has been cooled to room temperature, is added one or more hydrous polyvalent metal nitrates and the mixture heated under reflux to form the poly(metal phosphinate). Reaction involving the polyvalent metal nitrate or nitrates occurs as soon as the mixture reaches temperature, as is evidenced by the evolution of brown fumes which are vented from the reaction zone. Reflux is continued for a substantial period of time, about 1 to 2 hours, to ensure completion of the polymer-forming reaction. Formation of the poly(metal phosphinates) takes place through the formation in the reaction mixture of an intermediate which is a mixed acetic-phosphinic anhydride.

The physical character of the poly(metal phosphinates) will vary with the hydrocarbon groups on the phosphorous atom and in great measure will depend upon the ratio of the polyvalent metal or metals to the phosphinic acid portion in the polymers. Where the ratio of the polyvalent metal or metals to the phosphinic acid in the starting reaction mixture is stoichiometric, the formed polymers will generally be salt-like. As this ratio descends, in respect to the polyvalent metal or metals present in the starting reaction mixture, the formed polymers will become less plastic-like and increasingly salt-like. In some instances they will be thermoplastic.

The polymeric metal phosphinates which are plastic-like are soluble in common organic solvents such as benzene, chloroform, methylene chloride and in acetic anhydride. Those which are salt-like are insoluble in water and in common organic solvents. The polymeric metal phosphinates may be used as pigments in water-base latex or acrylic resin paints in amounts of from about 15 to 40 percent pigment volume concentration. Those which are thermoplastic may be pressure-molded to form shapes and articles. Plastic-like polymers which contain chromium as the metal may be used as rust inhibitors which are applied to steel surfaces from a 1 to 2 percent by weight solution of the polymer in benzene. The polymeric metal phosphinates of the present invention containing two or more different metals are particularly useful as conductors and in ferromagnetic applications such as core material for reactive circuit elements in transistors and printed circuits. However, the precise structure, i.e., as to disposition of the various metals within the polymer chain, is not known.

The general nature of the invention having been set forth, the following examples, are presented as specific illustrations thereof. It will be understood that the invention is not limited to these examples but is susceptible to various modifications that will be recognized by one of ordinary skill in the art.

EXAMPLE 1

One millimole (0.218 g.) of diphenylphosphinic acid was added to 25 ml. of redistilled acetic anhydride in a flask fitted with a reflux condenser and the mixture gently warmed to dissolve the phosphinic acid. The solution was allowed to cool to room temperature and 0.5 millimole (0.15 g.) of zinc nitrate hexahydrate, $Zn(NO_3)_2 \cdot 6H_2O$ added thereto. When the mixture was heated to reflux, a brown gas, characteristic of nitrogen dioxide, was evolved and a white precipitate formed. The mixture was refluxed for an hour and the solid polymer filtered from the reaction mixture. It was washed with acetic anhydride, then with absolute ethanol, and dried over potassium hydroxide at room temperature under reduced pressure (1–5 torr). The washed and dried polymer was in the form of fine needles. Yield: 0.23 g. (92%). No melting point to 370° C. Polymer did not ignite in open flame. It was soluble in methanol, methylene chloride and benzene.

EXAMPLE 2

A solution of 2.0 millimoles of diphenylphosphinic acid in 25 ml. of acetic anhydride was prepared as in Example 1 and cooled to room temperature. To the cooled solution was added 0.5 millimole (0.217 g.) of cerium (III) nitrate hexahydrate, $Ce(NO_3)_3 \cdot 6H_2O$. On heating this mixture to reflux, a white insoluble material precipitated from solution. Heating under reflux was continued for 2 hours. The polymer product, a light-buff colored solid, was filtered from the yellow reaction mixture which contained the excess phosphinic acid, washed with acetic anhydride, and dried over potassium hydroxide at room temperature under reduced pressure (1–5 torr). Salt-like polymer product. Yield: 0.38 g. (97.5%). The polymer did not exhibit a melting point up to 360° C. It ignited in a free flame to leave a gray residue. The polymer was not soluble in the common organic solvents, benzene, ethanol methylene chloride, nor in dimethyl sulfoxide. It was unaffected by water and 1 N sulfuric acid. Magnetic moment of the polymer was found to be 2.05 Bohn magnetrons which is consistent with cerium (III).

EXAMPLE 3

To a cool, room temperature, solution of 1.0 millimole (0.218 g.) of diphenylphosphinic acid in 25 ml. of acetic anhydride prepared as described in the previous examples was added 0.5 millimole of chromium (III) nitrate nonahydrate, $Cr(NO_3)_3 \cdot 9H_2O$. The mixture was brought to reflux. Red-brown nitrogen oxide fumes were evolved and a clear, intense green solution formed. Reflux was continued for 1 hour. A light green solid polymer was filtered from the reaction mixture, washed with acetic anhydride and with absolute ethanol. The washed solid polymer was dried over potassium hydroxide at room temperature under reduced pressure (1–5 torr). Yield: approximately 0.1 g. (37%). The solid polymer exhibited no melting point up to 400° C.

The filtrate from the separation of the solid polymer was subjected to flash evaporation under reduced pressure (1–5 torr) to remove the acetic anhydride and a second portion (about 0.15 g.) of solid polymer was obtained. It was a plastic-like green solid which could be cast into films from solution in benzene, methylene chloride or chloroform. This solid polymer melted to a viscous liquid at 38° C.

EXAMPLE 4

To a room temperature solution of 1.0 millimole (0.218 g.) of diphenylphosphinic acid in 25 ml. of acetic anhydride was added 0.5 millimole of zirconyl nitrate hydrate, $Zr(NO_3)_2 \cdot xH_2O$, where $x$ was estimated to be 8. The zirconyl nitrate appeared to be insoluble at room temperature. When the mixture was heated to reflux, a red-brown gas was evolved and the zirconyl nitrate began to dissolve. After refluxing the mixture for 1½ hours, a clear light yellow solution formed. On cooling no precipitate resulted. The solution was subjected to flash evaporation under reduced pressure (1–5 torr) to remove the acetic anhydride. A slightly yellow, plastic-like residue was obtained. The final drying was done on a freeze-drying apparatus at a pressure less than $10^{-3}$ torr. The dried, light yellow, solid polymer did not have a definite melting point but softened between 50 and 60° C. and became fluid at 120° C. The polymer was dissolved in benzene and purified by flowing through an alumina column and eluting with benzene and then with a 50% ethanol-water solution.

EXAMPLE 5

Diphenylphosphinic acid (0.436 g., 2.0 mmole) was dissolved in 25 ml. of acetic anhydride which was warmed to 60° C. After the acid had dissolved, the solution was cooled to room temperature and the hydrated ferric nitrate (0.404 g., 1 mmole) $Fe(NO_3)_3 \cdot 9H_2O$ was added to the vigorously stirred solution. The resulting deep yellow solution became turbid and then milky as the mixture was heated to reflux temperature. Refluxing was continued for 2 hours, the solution cooled to room temperature, and then filtered. The peach-colored solid was separated from the yellow solution by centrifugation, decantation, washing with fresh acetic anhydride and then repeating the centrifugation. The isolated solid, 0.38 g. (58%), which was dried under reduced pressure over sodium hydroxide, did not exhibit a melting point up to a temperature of 500° C. as determined by differential thermal analysis.

EXAMPLE 6

To the cooled solution of diphenylphosphinic acid (0.43 g., 2.0 mmole) dissolved in acetic anhydride (25 ml.), 0.24 g. (1.0 mmole) of hydrated copper nitrate $Cu(NO_3)_2 \cdot 3H_2O$ was added to the vigorously stirred solution. After refluxing for about 2 hours, the insoluble material (0.04 g.) was removed by filtration. The blue-green filtrate was placed in a rotary evaporator and the acetic anhydride and other volatile materials removed. The bluish-green solid was washed with fresh acetic anhydride and dried over sodium hydroxide under reduced pressure for several weeks (0.42 g.) (84%). The dried solid exhibited melting at 308° C. followed by decomposition; no sharp temperature of crystallization was noted when the differential thermal analysis was run in the cooling mode.

EXAMPLE 7

After the diphenylphosphinic acid (0.43 g., 2.0 mmoles) was dissolved in the acetic anhydride (25 ml.) and the solution cooled to room temperature, the hydrated cobalt nitrate (0.29 g., 1.0 mmoles) ($Co(NO_3)_2 \cdot 6H_2O$) was added to the vigorously stirred solution. When the violet solution was brought to reflux, a copious amount of blue solid formed, and was filtered, washed and dried over sodium hydroxide under reduced pressure (0.38 g.) (64%). The blue solid exhibited melting at 367° C. (differential thermal analysis) and when the melt was cooled, solidification occurred at 338° C.

EXAMPLE 8

Diphenylphosphinic acid (0.436 g., 2.0 mmoles) was dissolved in warmed (60° C.) acetic anhydride (25 ml.), and the solution cooled to room temperature. On addition of 0.145 g. (0.5 mmole) hydrated cobalt nitrate ($Co(NO_3)_2 \cdot 6H_2O$) the solution became violet, but clear, and remained this color after adding hydrated chromium nitrate (0.200 g., 0.5 mmole) ($Cr(NO_3)_3 \cdot 9H_2O$). The solution became almost black, or very deep purple, when the solvent was heated to reflux. The red-brown color of nitrogen dioxide was noted during the refluxing (1.5 hours) and an insoluble material formed. The blue-green mixture was filtered, the solid washed with fresh acetic anhydride, and dried over sodium hydroxide under reduced pressure. The blue solid (0.55 g.) (48%) did not melt or indicate a decomposition up to 500° C., as recorded by differential thermal analysis. Although the material contains a 1 to 1 ratio of chromium to cobalt atoms, the procedure could be used to prepare materials containing any ratio of the metal ions in the polymer.

*Analysis.*—Found (percent): C, 55.38; H, 4.56; P, 11.56. Calculated for $CrCo[((C_6H_5)_2PO_2)_4CH_3CO] \cdot (CH_3C)_2O$ (percent): C, 56.85; H, 4.33; P, 10.86.

Magnetic moment: 5.80 Bohr magnetron, a value indicating an anomalous magnetic property which is greater than the sum of the two individual polymers.

EXAMPLE 9

Diphenylphosphinic acid (0.436 g., 2.0 mmoles) was dissolved, by warming to 60° C., in 25 ml. of acetic anhydride. To the room temperature, vigorously stirred solution was added 0.145 g. (0.5 mmole) of cobalt nitrate ($Co(NO_3)_2 \cdot 6H_2O$) (clear blue-violet or royal blue solution) and 0.121 g. (0.5 mmole) of copper nitrate ($Cu(NO_3)_2 \cdot 3H_2O$) to give a dark blue solution. When the solution was brought to reflux, the red-brown color of $NO_2$ was noted, and a large amount of fluffy insoluble material formed. After 3½ hours refluxing, the solution was cooled to room temperature, washed with fresh acetic anhydride, and dried over sodium hydroxide under reduced pressure (0.27 g.) (25%). Differential thermal analysis: M.P. 369° C. and crystallized at 330° C. on cooling.

*Analysis:* Found (percent): C, 57.01; H, 4.26; P, 11.09. Calculated for $CoCu[(C_6H_5)_2P(O)O]_4 \cdot (CH_3C)_2O$ percent: C, 57.13; H, 4.26; P, 11.33.

EXAMPLE 10

Hydrated chromium nitrate (0.200 g., 0.50 mmole) ($Cr(NO_3)_3 \cdot 9H_2O$) and hydrated iron nitrate (0.202 g., 0.5 mmole) ($Fe(NO_3)_3 \cdot 9H_2O$) were ground to fine powders and then added separately to a vigorously stirred solution of diphenylphosphinic acid (0.436 g., 2.0 mmoles) in 25 ml. of acetic anhydride. The addition of the iron nitrate resulted in a canary yellow solution which became milky when the chromium nitrate was added. The mixture was heated to reflux and the red-brown color of nitrogen dioxide was noted at this temperature. After refluxing for one hour, a light greenish-blue mixture of liquid and solid formed. The cooled solution was filtered and the greenish-blue solid washed with fresh acetic anhydride, absolute ethanol and then dried over sodium hydroxide under reduced pressure (0.3 g.) (28%).

*Analysis:*—Found (percent): C, 57.57; H, 4.36; P, 11.39. Calculated for $CrFe[((C_6H_5)_2P(O)O)_4(CH_3CO)_2]$ (percent): C, 57.06; H, 4.24; P, 11.32.

As will be evident to those skilled in the art, various modifications can be made in light of the foregoing disclosure without departing from the scope and spirit thereof.

What is claimed as new and desired to be secured by Letters Patent of the United States is:

1. A method of preparing a polymeric metal phosphinate which comprises subjecting a solution of a dihydrocarbon phosphinic acid in acetic anhydride which contains a hydrous polyvalent metal nitrate in a proportion which corresponds to a ratio of 1 mole of the polyvalent metal to from about 1 to 4 moles of the dihydrocarbon phosphinic acid to heating under reflux until the polymer is formed; wherein said polyvalent metal nitrate is selected from the group consisting of the nitrates of the metals of Group II–A, Group I–B, Group II–B, Group III–B, Group IV–B, Group V–B, Group VI–B, Group VII–B, Group VIII and the rare earths of the periodic table.

2. A method as defined in claim 1, wherein the hydrous polyvalent metal nitrate is a hydrated zinc nitrate.

3. A method as defined in claim 1, wherein the hydrous polyvalent metal nitrate is a hydrated chromium nitrate.

4. A method as defined in claim 1, and separating the acetic anhydride from the reaction mixture by flash evaporation.

5. A method according to claim 1 wherein said solution contains said phosphinic acid and a trivalent metal nitrate in a molar ratio of 2:1.

6. The method of claim 5 wherein said solution contains 1 mole of said phosphinic acid and .5 mole of chromium (III) nitrate nonahydrate.

7. A method of preparing a polymeric metal phosphinate which comprises subjecting a solution of a dihydrocarbon phosphinic acid in acetic anhydride which contains two or more different hydrous polyvalent metal nitrates in a proportion which corresponds to a ratio of 1 mole of the total polyvalent metal content to from about 1 to 4 moles of the dihydrocarbon phosphinic acid to heating under reflux until the polymer is formed; wherein said metal nitrates are selected from the group consisting of the metals of Groups II–A, I–B, II–B, III–B, IV–B, V–B, VI–B, VII–B, VIII and the rare earths of the periodic table.

8. A method according to claim 7 wherein said solution contains said phosphinic acid and only trivalent metal nitrates in a molar ratio of 2 moles of said phosphinic acid per mole of total nitrate present.

9. The method of claim 7 wherein said two or more hydrous polyvalent metal nitrates are present in an equal molar ratio.

10. The method of claim 7 wherein said two or more hydrous polyvalent metal nitrates are present in an unequal molar ratio.

11. The method of claim 7 which further comprises separating the acetic anhydride from the reaction mixture by flash evaporation.

12. The method of claim 9 wherein said solution contains said phosphinic acid present in the amount of 2 moles, hydrated cobalt (II) nitrate present in the amount of 0.5 mole and hydrated chromium (III) nitrate present in the amount of 0.5 mole.

13. The product produced by the method of claim 12.

14. The method of claim 9, wherein said solution contains 2 moles of said phosphinic acid, 0.5 mole of hydrated copper (II) nitrate and 0.5 mole of hydrated cobalt (II) nitrate.

15. The method of claim 9 wherein said solution contains 2 moles of said phosphinic acid, 0.5 mole of hydrated chromium (III) nitrate and 0.5 mole of hydrated iron (III) nitrate.

16. The product produced by the method of claim 15.

References Cited

UNITED STATES PATENTS 3,275,574  9/1966  Saraceno _____ 260—2 P
3,255,125  6/1966  Block et al. _____ 260—2 P SAMUEL H. BLECH, Primary Examiner U.S. Cl. X.R.

117—132 R; 252—389, 518, 519, 520, 521; 260—2 M, 29.6 NR, 31.2 R, 33.4 R, 33.6 R, 33.8 R